US008021546B2

(12) United States Patent
Hukki

(10) Patent No.: US 8,021,546 B2
(45) Date of Patent: Sep. 20, 2011

(54) SCREEN CLAMP

(76) Inventor: Ari M. Hukki, Boynton Beach, FL (US)

( * ) Notice: Subject to any disclaimer, the term of this patent is extended or adjusted under 35 U.S.C. 154(b) by 152 days.

(21) Appl. No.: 12/387,387

(22) Filed: May 1, 2009

(65) Prior Publication Data

US 2010/0084329 A1 Apr. 8, 2010

Related U.S. Application Data

(60) Provisional application No. 61/126,139, filed on May 1, 2008.

(51) Int. Cl.
*B07B 1/48* (2006.01)
*B07B 1/49* (2006.01)
*B01D 33/00* (2006.01)

(52) U.S. Cl. ........ 210/232; 210/388; 209/399; 209/403; 209/405

(58) Field of Classification Search .................. 210/232, 210/388; 209/399, 403, 405
See application file for complete search history.

(56) References Cited

U.S. PATENT DOCUMENTS

| | | | | |
|---|---|---|---|---|
| 4,457,839 | A * | 7/1984 | Bailey | 209/234 |
| 4,582,597 | A * | 4/1986 | Huber | 209/313 |
| 4,744,898 | A * | 5/1988 | Bailey | 210/236 |
| 5,485,924 | A * | 1/1996 | Zaun | 209/300 |
| 5,615,776 | A * | 4/1997 | Bjorklund et al. | 209/403 |
| 6,283,303 | B1 * | 9/2001 | Lane et al. | 209/405 |
| 6,935,511 | B2 * | 8/2005 | Seyffert et al. | 209/404 |
| 2003/0057140 | A1 * | 3/2003 | Hukki et al. | 209/405 |

* cited by examiner

*Primary Examiner* — Thomas M Lithgow
(74) *Attorney, Agent, or Firm* — Strasburger & Price, LLP

(57) ABSTRACT

This invention relates to a method for easy installation and removal of a screen assembly for vibratory machinery and more particularly to shake table screening. The screen assembly comprises a screen frame, a screen cloth and a screen bed, whereby no clamping components are visible on top of the screen. Each assembly section can be controlled independently and clamping force is controlled by a pneumatic regulator located near an air line connection on the side of a shaker.

5 Claims, 19 Drawing Sheets

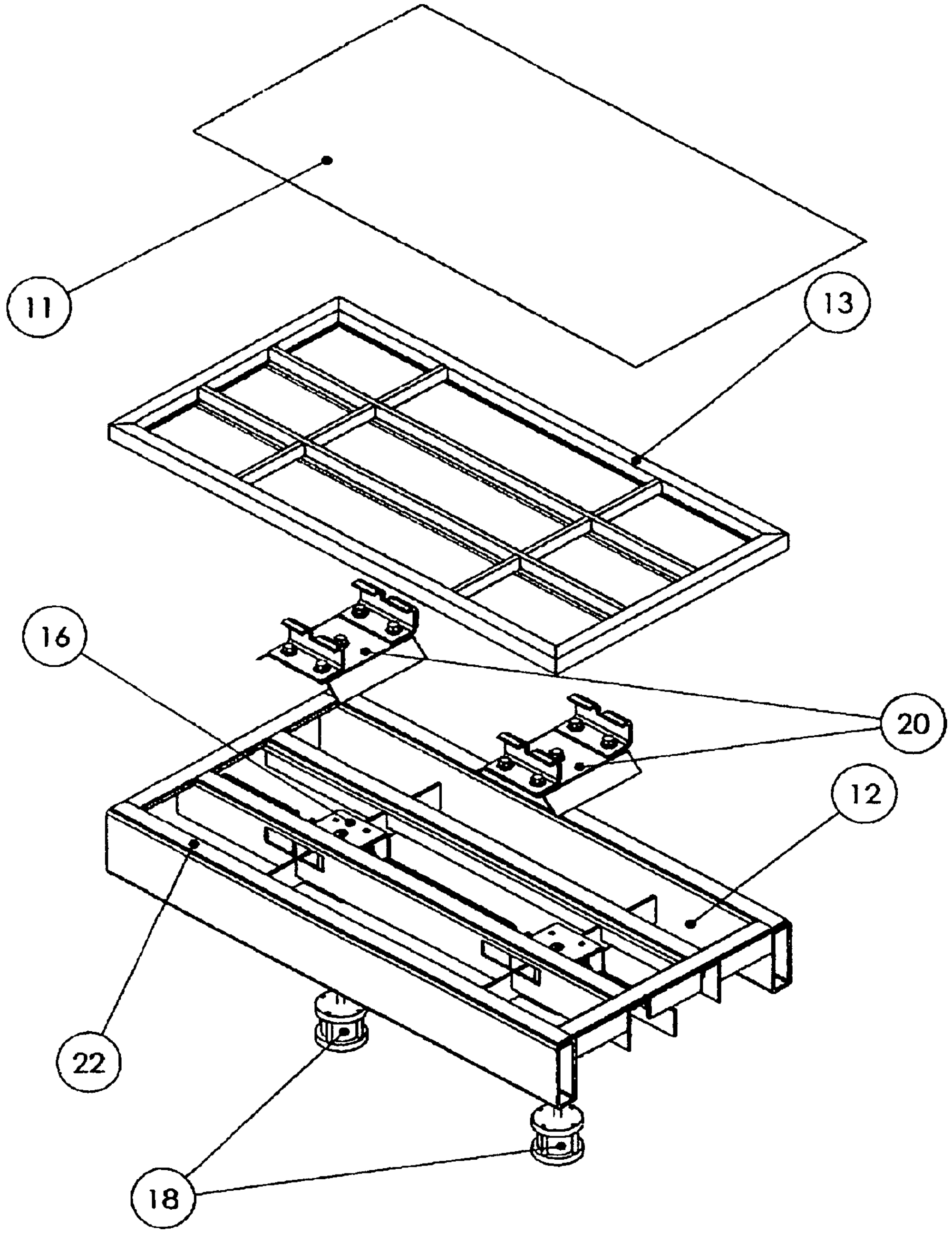
Figure 1: Screen Bed Assembly

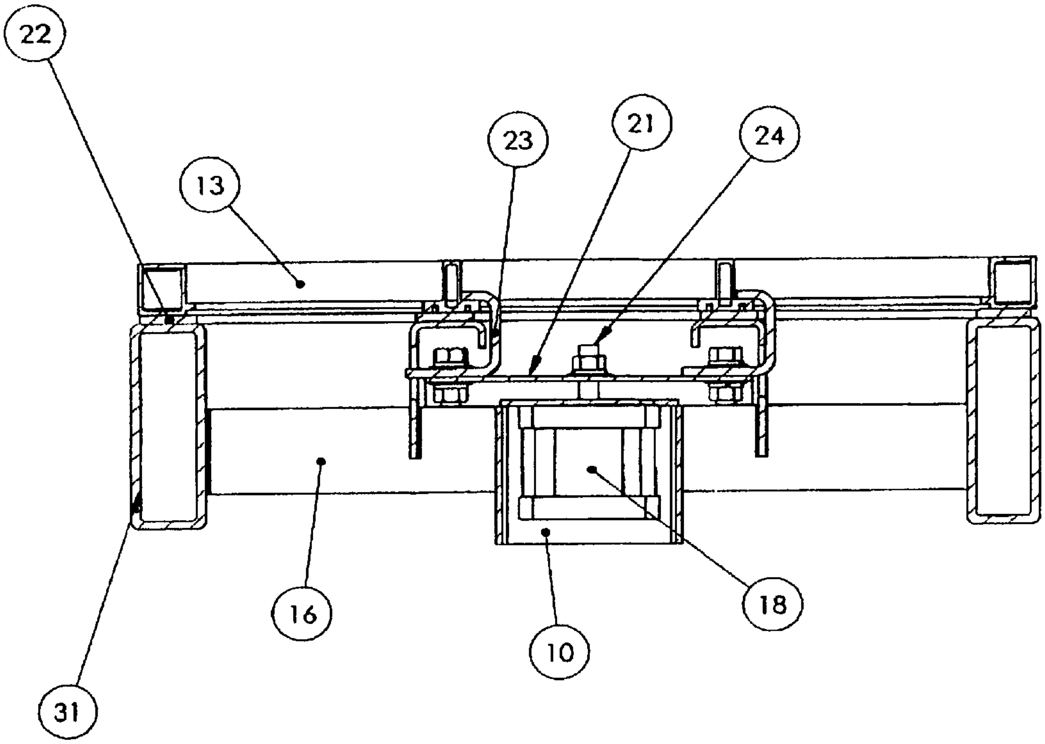
Figure 1A: Screen Bed Assembly Section

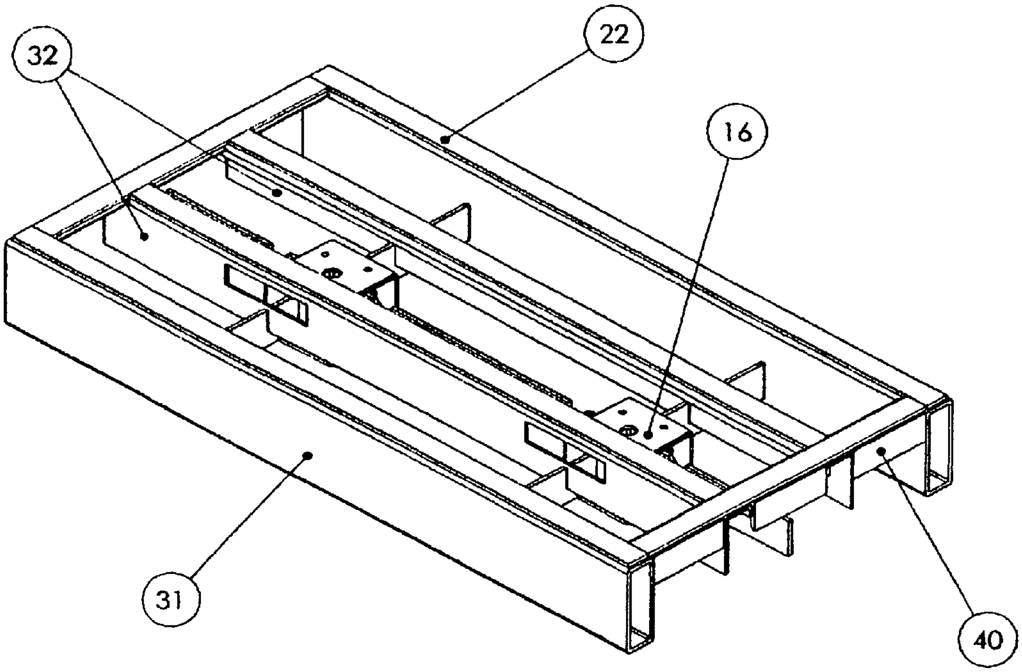
Figure 2: Screen Bed

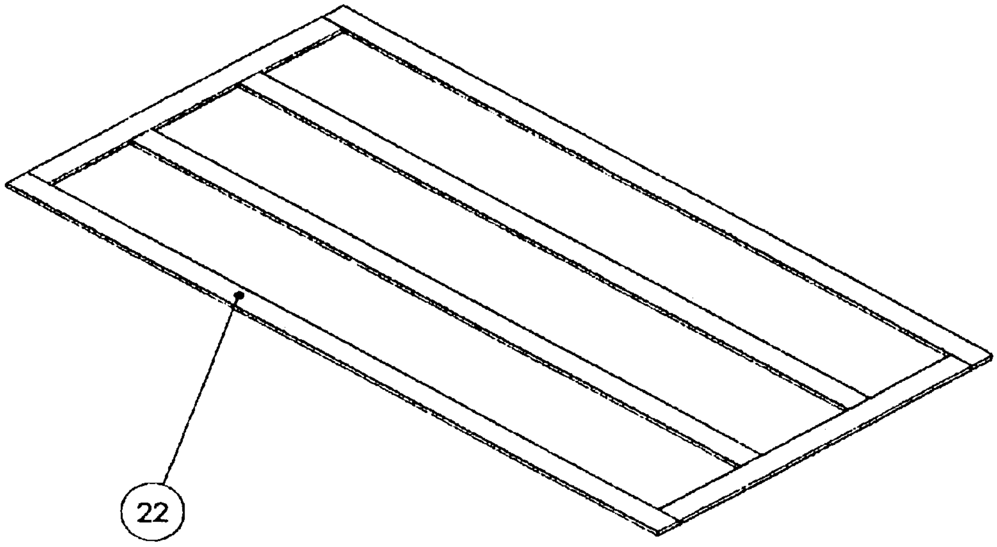
Figure 2A: Screen Gasket

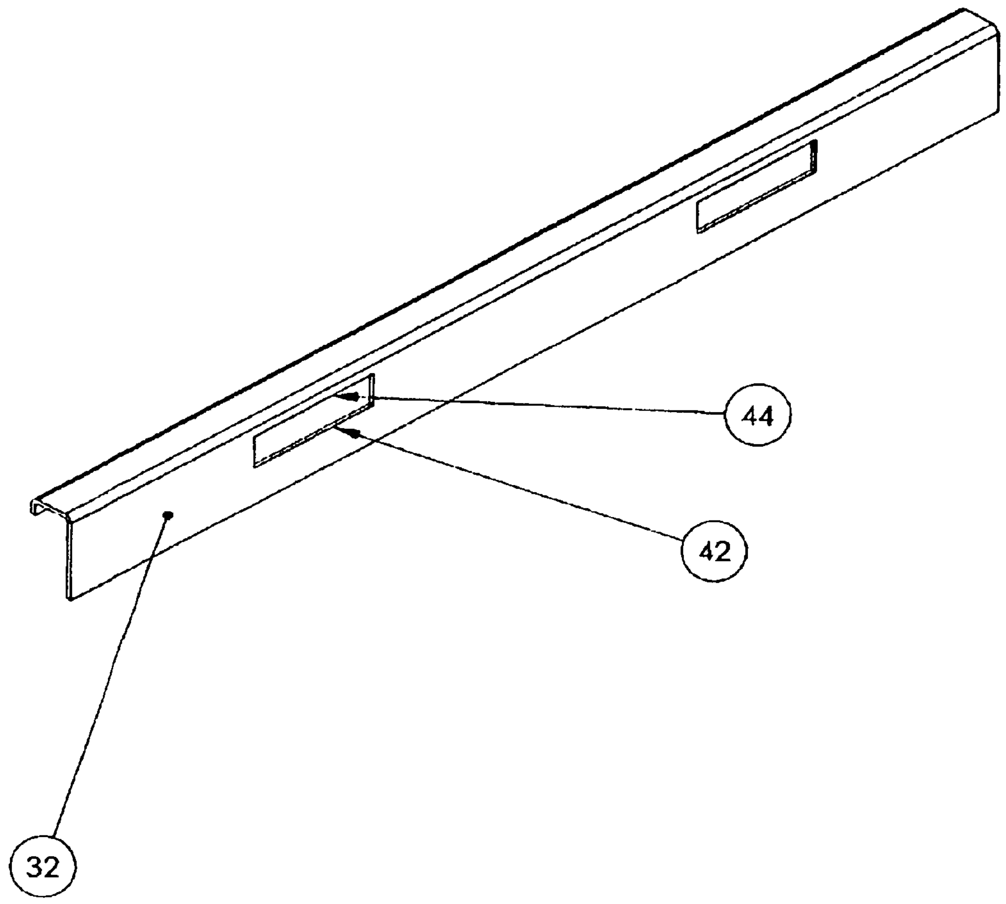
Figure 3: Screen Support

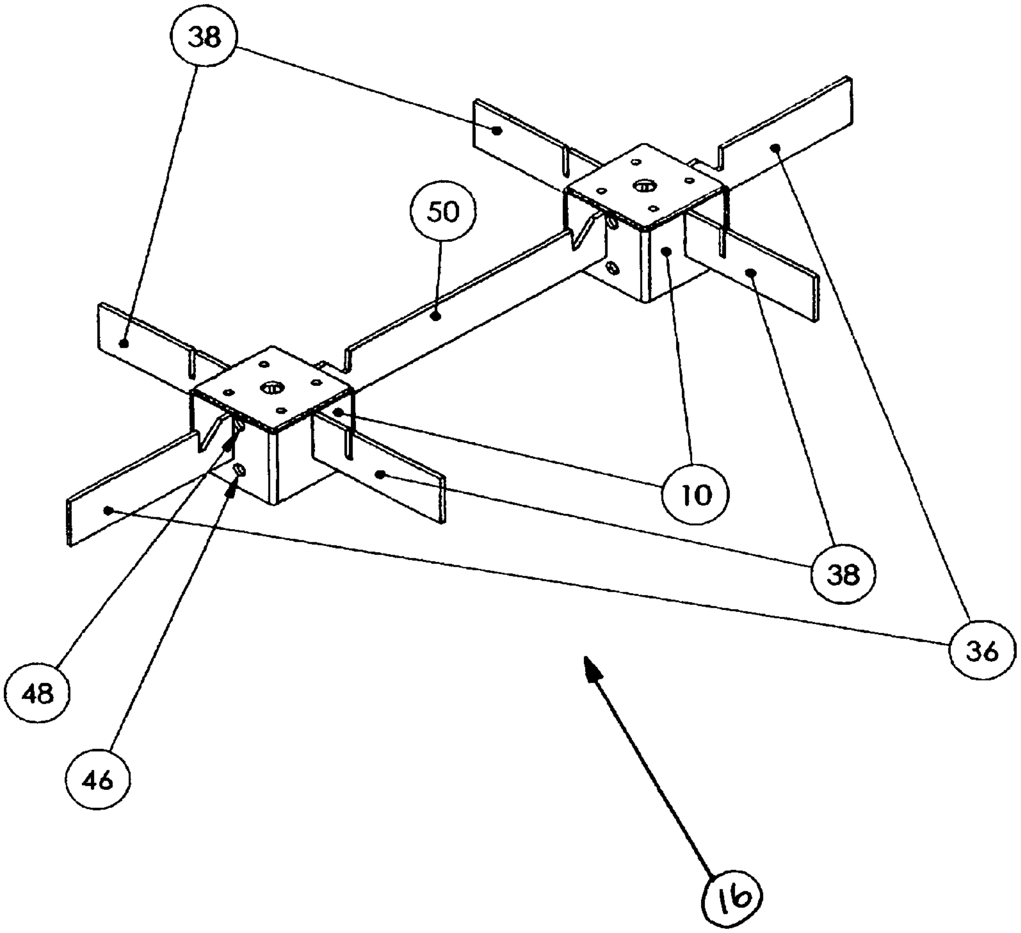
Figure 4: Support Bracket

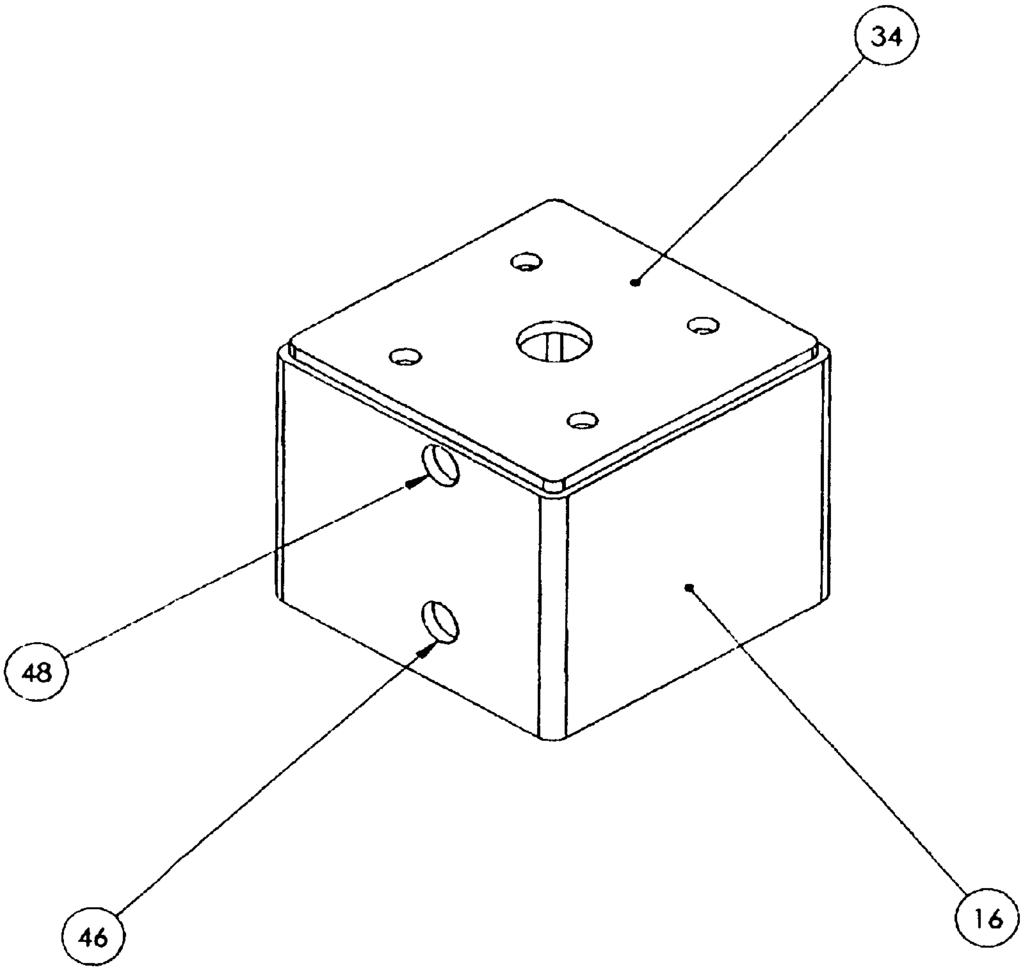
Figure 4A: Pneumatic Cylinder Holder

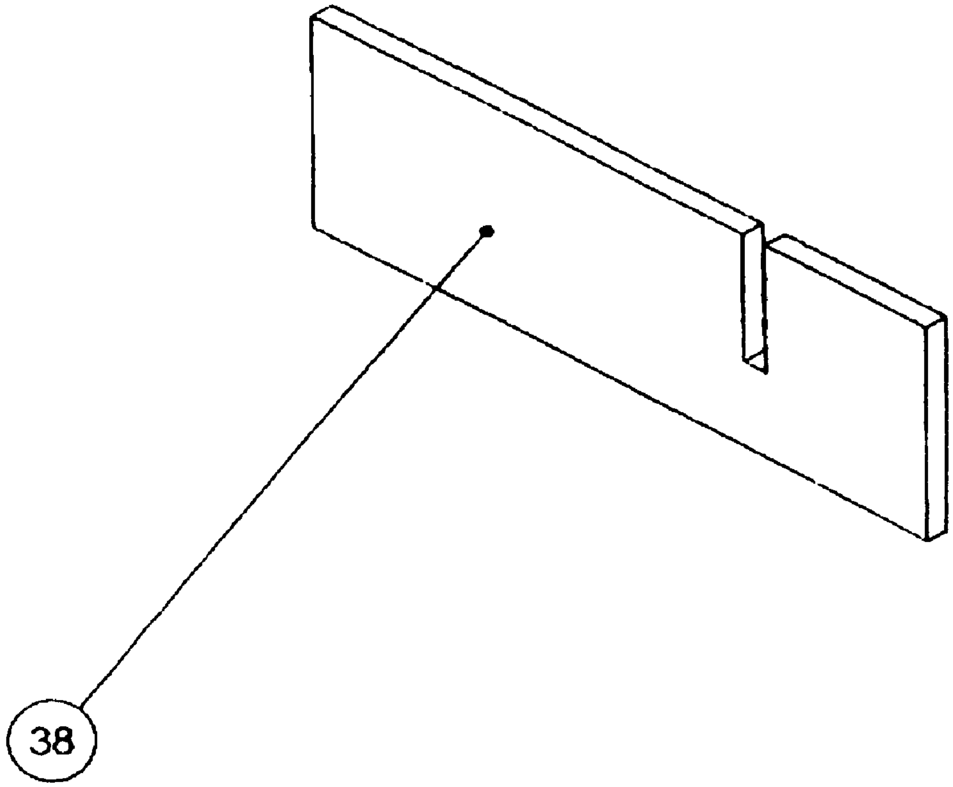
Figure 4B: Cylinder Holder Support

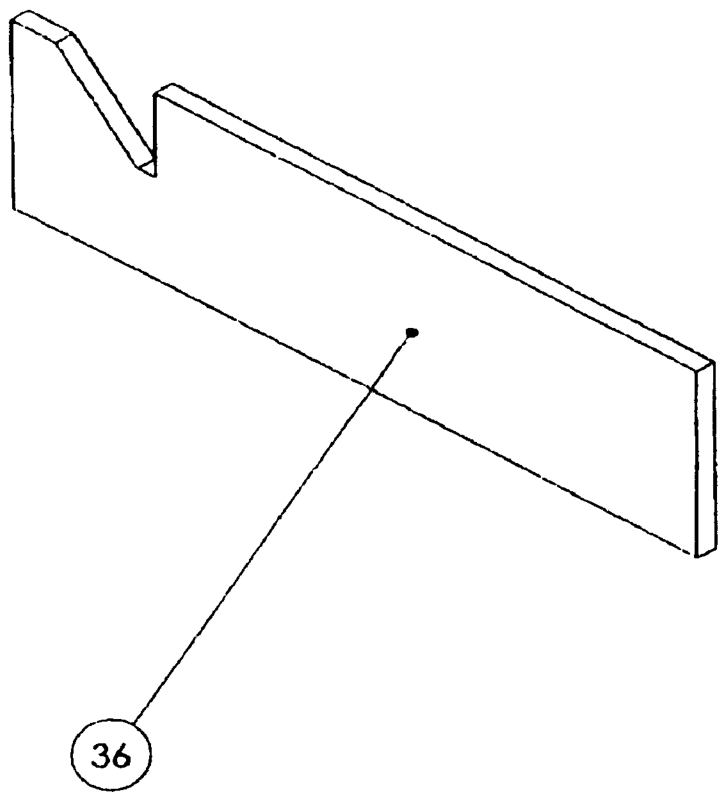
Figure 4C: Cylinder Holder Support

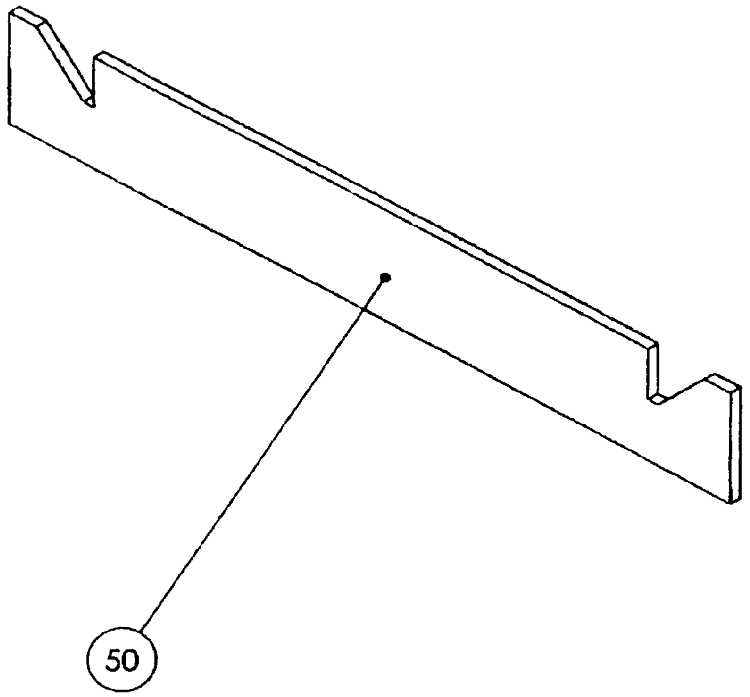
Figure 4D: Cylinder Holder Center Support

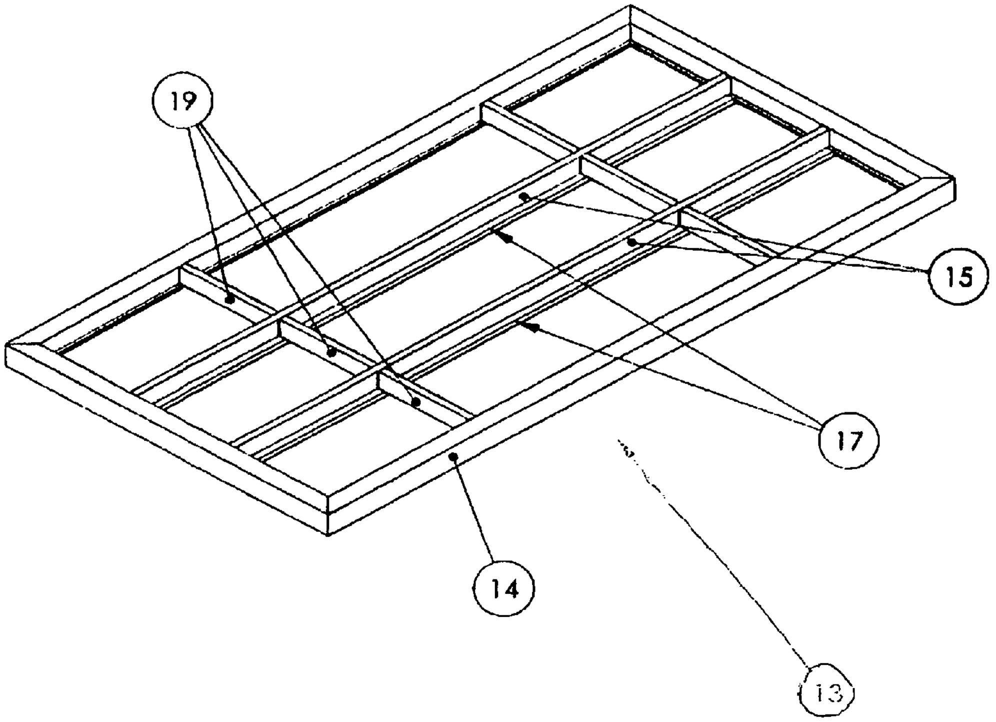
Figure 5: Screen Frame

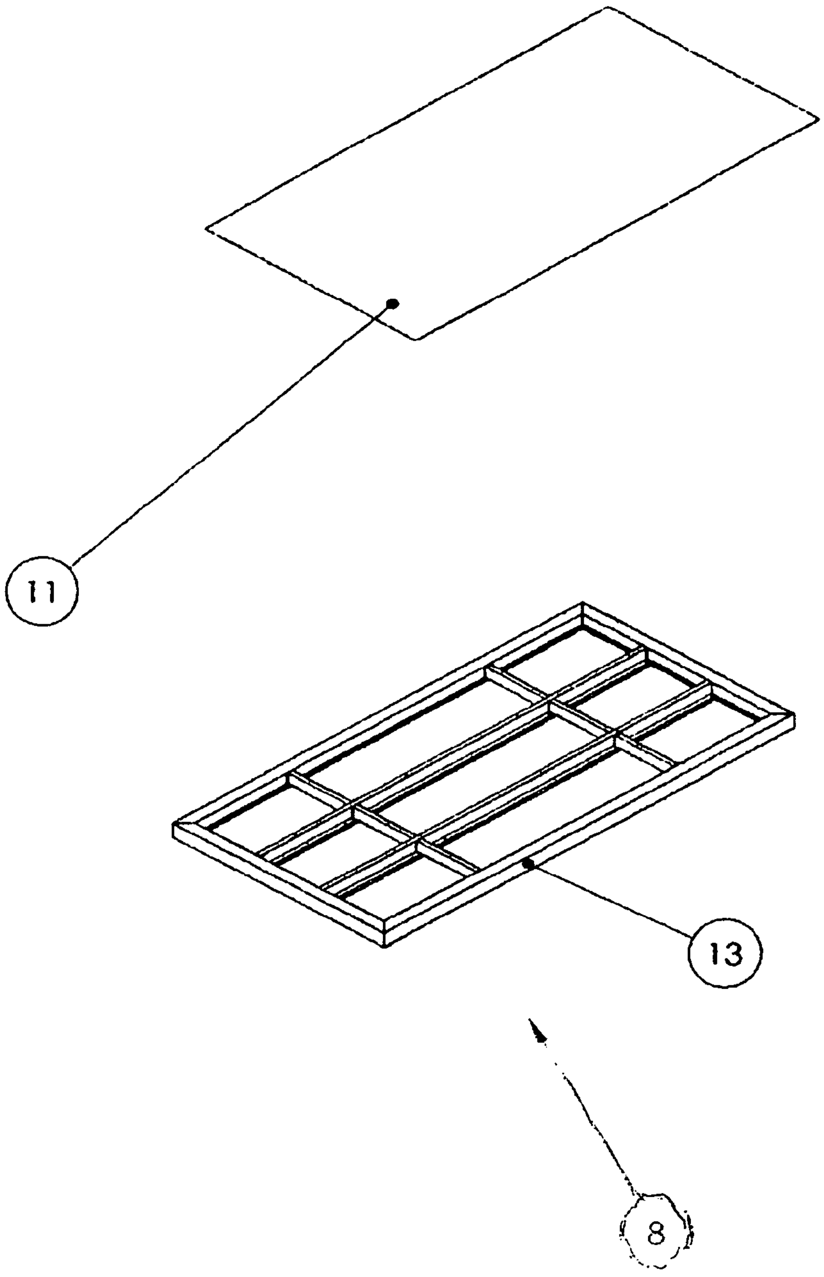
Figure 5A: Screen Assembly

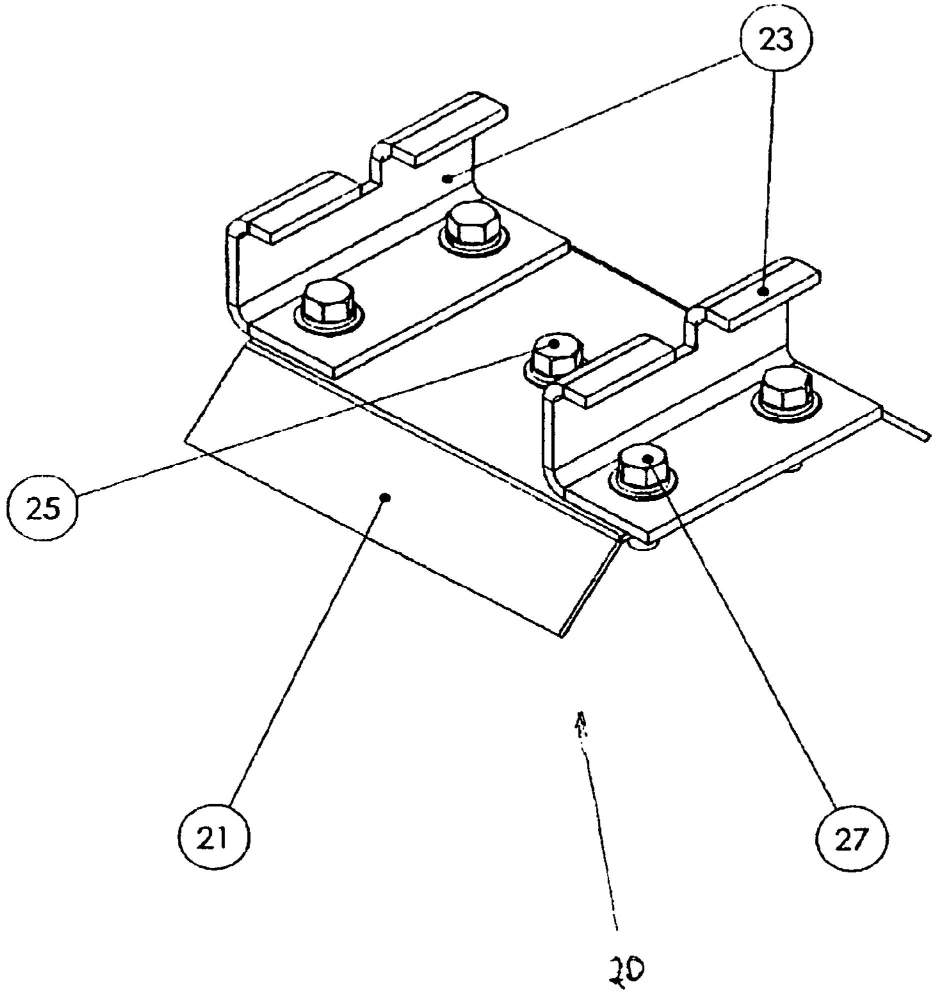
Figure 6: Screen Clamp Assembly

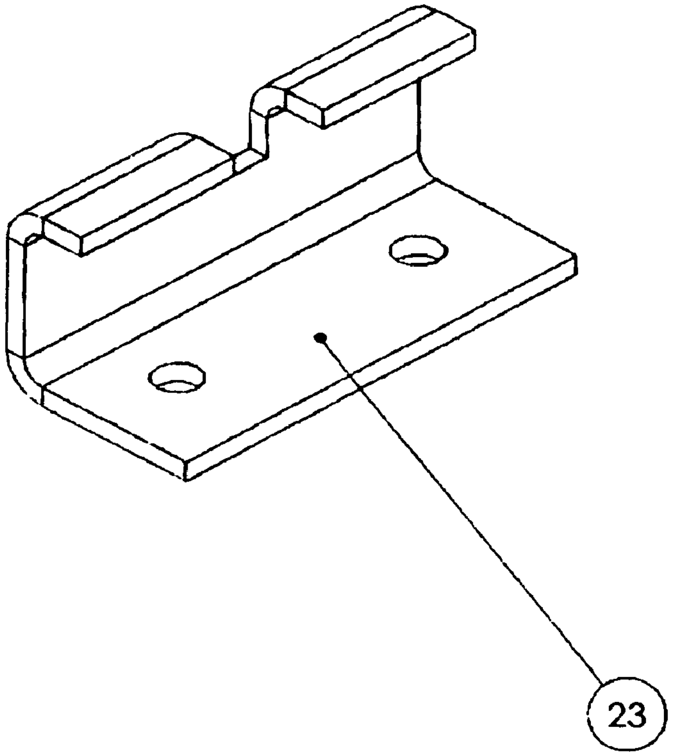
Figure 6A: Clamp Finger Plate

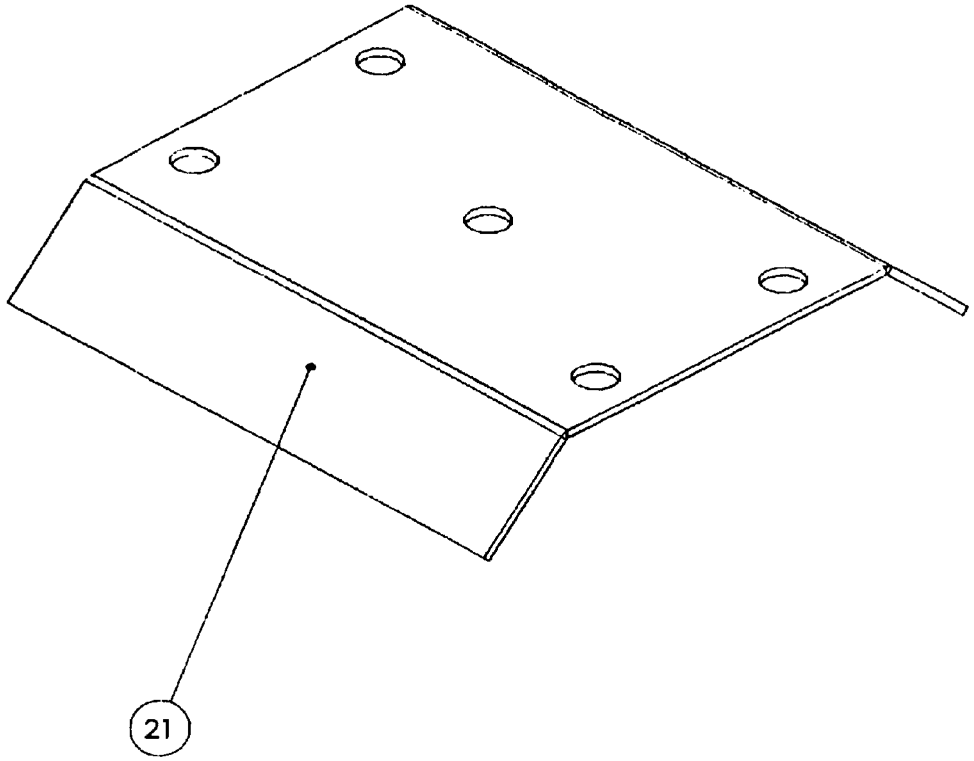
Figure 6B: Clamp Plate

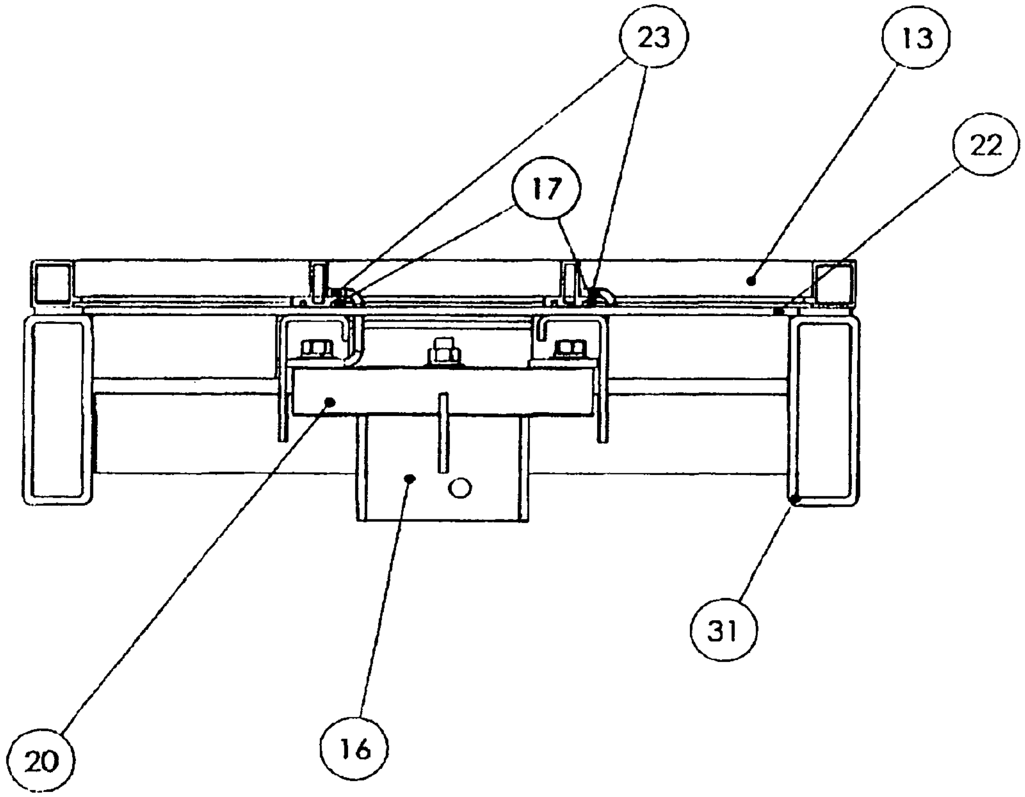
Figure 7: Screen Clamp - closed

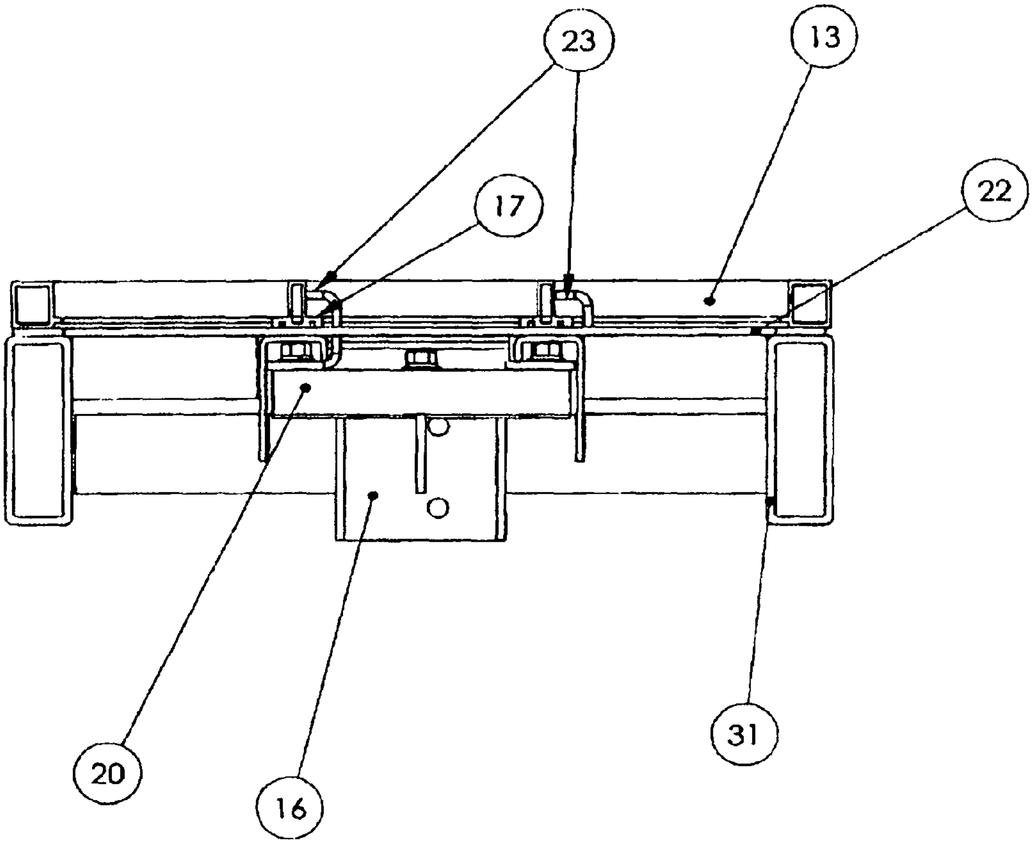
Figure 8: Screen Remove - step 1: Screen Clamp up

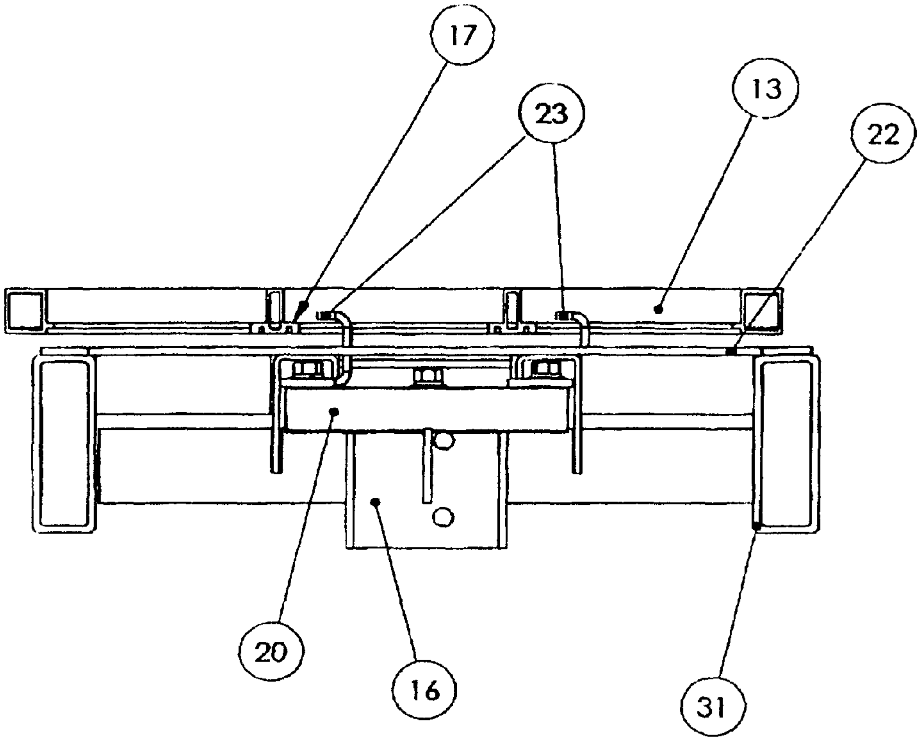
Figure 9: Screen Remove - step 2: Screen Clamp up, Screen Frame moved left away from Clamp Finger Plate

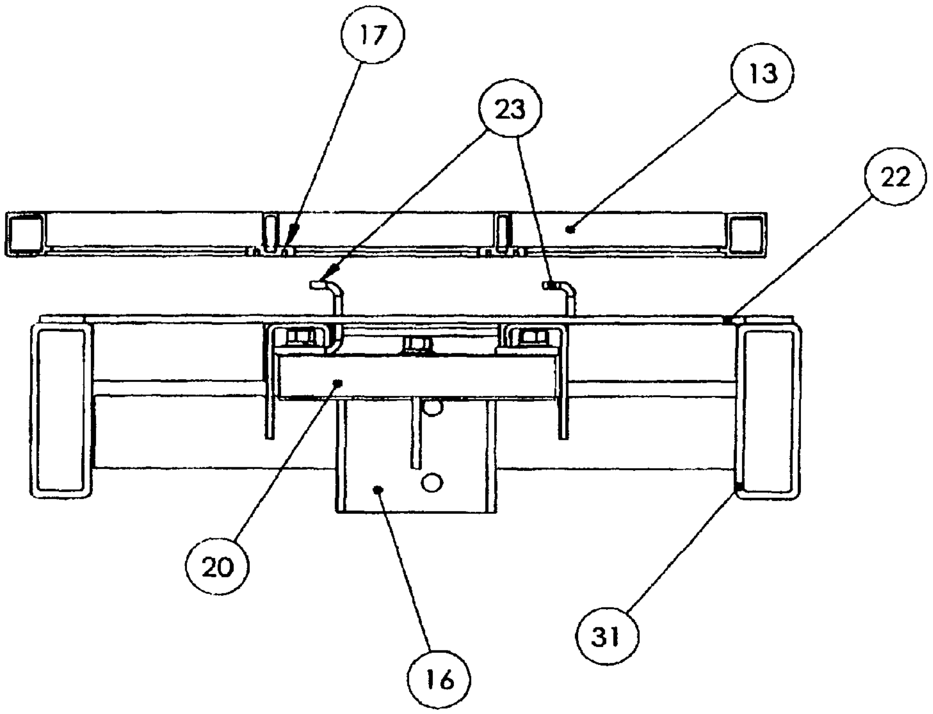
Figure 10: Screen Remove- step 3: Screen Clamp up, Screen Frame moved left away from Clamp Finger Plate and up for removal

SCREEN CLAMP

CROSS-REFERENCE TO RELATED APPLICATIONS

This application claims the benefit of U.S. Provisional Application No. 61/126,139, filed on May 1, 2008.

STATEMENT REGARDING FEDERALLY-SPONSORED RESEARCH OR DEVELOPMENT

N/A

NAMES OF THE PARTIES TO A JOINT RESEARCH AGREEMENT

N/A

INCORPORATION-BY-REFERENCE OF MATERIAL SUBMITTED ON A COMPACT DISK

N/A

BACKGROUND OF THE INVENTION

1. Field of the Invention

The field of the invention is screens for vibratory machinery and more particularly to shake table screening.

2. Description of the Related Art

Shake tables are well known to filter solids from liquids in separation methods with oil. However, achieving good separation is difficult to achieve, including easy installation and removal of the screen assembly.

BRIEF SUMMARY OF INVENTION

This invention allows for easy installation and removal of a screen assembly in a shaker. The screen assembly comprises a screen frame and a screen cloth, which is bonded to it from a screen bed with no tools required. No clamping components are visible on top of the screen assembly, which allows free flow of processed material to move onto the screen assembly surface. A separate pneumatic control panel is mounted in front of the shaker. Each screen bed assembly section can be controlled independently, and a clamping force is adjustable via pneumatic regulator located near an air line connection on a side of the shaker.

BRIEF DESCRIPTION OF THE FIGURES

FIG. 1 shows an exploded view of a screen bed assembly;

FIG. 1A show a section view of a screen bed assembly;

FIG. 2 shows a screen bed;

FIG. 2A shows a screen gasket;

FIG. 3 shows a screen support;

FIG. 4 shows a support bracket;

FIG. 4A shows a pneumatic cylinder holder;

FIG. 4B shows one type of a cylinder holder support:

FIG. 4C shows another type of a cylinder holder support;

FIG. 4D shows yet another type of a cylinder holder support;

FIG. 5 shows a screen frame;

FIG. 5A shows a screen assembly;

FIG. 6 shows a screen clamp assembly;

FIG. 6A shows a clamp finger plate;

FIG. 6B shows a clamp plate;

FIG. 7 shows a closed screen clamp;

FIG. 8 shows a view of a damped up screen;

FIG. 9 shows a view of a clamped up screen with the screen frame moved left away from a clamp finger plate;

FIG. 10 shows a view of a clamped up screen with the screen moved left away from a clamp finger place and up for screen removal.

DETAILED DESCRIPTION OF THE INVENTION

This invention allows easy installation and removal screen assembly (8) comprising: screen frame (13) and screen cloth (11) bonded to it from screen bed (31) (with no tools required). No clamping components are visible on top of screen allowing free flow of processed material to move on screen surface. Separate pneumatic control panel is mounted in front of shaker. Each screen bed assembly section FIG. 1 can be controlled independently and clamping force is adjustable via pneumatic regulator located near air line connection on side of shaker.

Screen clamp includes the following parts:

1. Air cylinder Bracket 16
2. 2 Pneumatic cylinders 18
3. 2 Supports 32
4. 2 clamp plates 21
5. 4 clamp finger hooks 23
6. bolts and nuts Principle of Operation:

1. Screen clamp components are assembled on 4 individual screen bed sections (31) in shaker basket.
2. Cylinder brackets (16) are welded into Shaker bed as well as two supports (32) for screen frame (13) center bars (15).
3. Pneumatic cylinders (18) are bolted into cylinder cups (10) on cylinder brackets (16).
4. Clamp finger hooks (23) are bolted on clamp plates (21) and these assemblies are bolted on pneumatic cylinder pistons (24).
5. Slots on supports (32) act as stops (42, 44) for clamp plates (21) to move too high when pneumatic cylinders (18) are pressurized.
6. Suitable pneumatic connections with control valves are used to operate pneumatic cylinder piston rods (18) up and down.
7. When cylinder piston rods (24) with clamp plates (21) are in upward position, screen frame (13) can be placed on shaker bed (31).
8. Screen frame (13) is then pushed towards clamp finger hooks (23).
9. Two center members (15) on screen frame (13) have ledges (17) on both sides of them.
10. When screen frame (13) is pushed in place, clamp finger hooks (23) are above ledges (17) on frame center members (15).
11. When pneumatic cylinder piston rods (24) are pulled down, clamp finger hooks (23) will lock into screen frame center member ledges (17) and pull them firmly down against shaker bed supports (32).

I claim:

1. A system for retaining a filtering screen in a vibratory machine, comprising:

a screen bed removably mounted in said vibratory machine;

a screen cloth bonded to a screen frame positioned on said screen bed;

a first hook mounted over a pneumatic cylinder disposed with said screen bed;

a second hook mounted with said first hook over said pneumatic cylinder; and a cylinder bracket disposed on said pneumatic cylinder, wherein said cylinder bracket comprising a cylinder holder support member, wherein said pneumatic cylinder is configured to move said first hook between a downward position clamping said screen frame with said screen bed, and an upward position not resisting movement of said screen frame away from said screen bed;

wherein said screen bed comprises a first support member that supports said screen frame, and wherein said first hook is positioned in a slot in said first support member;

wherein said slot is configured to prevent the upward movement of said first hook beyond a predetermined distance;

wherein said screen frame comprises a first frame member having a ledge, and wherein said first hook is configured to contact said ledge and move said screen frame downward when moving from said upward position to said downward position;

wherein said screen frame further comprising a second frame member having a ledge;

wherein said second hook is configured to contact said second frame member ledge and move said screen frame downward when said first hook moves from said upward position to said downward position;

wherein said screen bed further comprises a second support member that supports said screen frame, and wherein said second hook is positioned in a slot in said second support member;

wherein said second support member slot is configured to prevent the upward movement of said second hook beyond said predetermined distance; and wherein said screen bed first support member is disposed in a first slot in said cylinder holder support member, and wherein said screen bed second support member is disposed in a second slot in said cylinder holder support member.

2. The system of claim 1, wherein said pneumatic cylinder comprises a piston rod, and wherein said piston rod is disposed through an opening in said cylinder bracket and is configured to move said first hook and said second hook.

3. An apparatus for retaining a screen in a shaker, comprising:

a screen cloth bonded to a screen frame;

a screen bed having a first support member with a slot;

a pneumatic cylinder disposed with said screen bed;

a first hook mounted over said pneumatic cylinder;

a second hook attached with said first hook and mounted over said pneumatic cylinder; and a cylinder bracket disposed on said pneumatic cylinder, wherein said screen bed is mounted in said shaker;

wherein said screen frame is positioned on said screen bed;

wherein said first hook is positioned in said first support member slot;

wherein said pneumatic cylinder is configured to move said first hook between a downward position clamping said screen frame with said screen bed, and an upward position not resisting removal of said screen frame away from said screen bed;

wherein said first member support slot is configured to prevent the upward movement of said first hook beyond a predetermined distance;

wherein said screen frame comprises a first frame member having a ledge, and wherein said first hook is configured to contact said ledge and move said screen frame downward when moving from said upward position to said downward position;

wherein said screen frame further comprising a second frame member having a ledge;

wherein said second hook is configured to contact said second frame member ledge and move said screen frame downward when said first hook moves from said upward position to said downward position; and wherein said cylinder bracket comprising a cylinder holder support member having a slot, and wherein said screen bed first support member is disposed in said cylinder holder support member slot.

4. The apparatus of claim 3, wherein said screen bed comprises a second support member that supports said screen frame, wherein said second hook is positioned in a slot in said second support member, and wherein said second support member slot is configured to prevent the upward movement of said second hook beyond said predetermined distance.

5. The system of claim 4, herein said pneumatic cylinder comprises a piston rod, and wherein said piston rod is disposed through an opening in said cylinder bracket and is configured to move said first hook and said second hook.

* * * * *